(12) United States Patent
Coburn, IV et al.

(10) Patent No.: US 11,528,522 B2
(45) Date of Patent: Dec. 13, 2022

(54) POLICIES FOR MEDIA PLAYBACK

(71) Applicant: Sonos, Inc., Santa Barbara, CA (US)

(72) Inventors: Arthur Coburn, IV, Lexington, MA (US); Ron Kuper, Arlington, MA (US); Ted M. Lin, Ayer, MA (US); Sherwin Liu, Boston, MA (US); Luis Vega, Arlington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/665,810

(22) Filed: Oct. 28, 2019

(65) Prior Publication Data

US 2020/0059682 A1    Feb. 20, 2020

Related U.S. Application Data

(63) Continuation of application No. 14/330,825, filed on Jul. 14, 2014, now Pat. No. 10,462,505.

(51) Int. Cl.
*H04N 21/254* (2011.01)
*H04N 21/436* (2011.01)
(Continued)

(52) U.S. Cl.
CPC ..... *H04N 21/2541* (2013.01); *G06F 16/4387* (2019.01); *G11B 27/102* (2013.01);
(Continued)

(58) Field of Classification Search
CPC ......... H04N 21/2541; H04N 21/43615; H04N 21/2387; H04N 21/4126; H04N 21/8113;
(Continued)

(56) References Cited

U.S. PATENT DOCUMENTS 5,406,634 A    4/1995  Anderson et al.
5,440,644 A    8/1995  Farinelli et al.
(Continued)

FOREIGN PATENT DOCUMENTS

EP    1389853 A1    2/2004
KR    20090017795   2/2009
(Continued)

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
(Continued)

*Primary Examiner* — Michael Roswell
(74) *Attorney, Agent, or Firm* — Fortem IP LLP; Benjamin Urban

(57) ABSTRACT

Example techniques related to polices for media playback systems. An example implementation involves a computing system receiving data representing a request to play back first audio tracks on one or more first playback devices of a first media playback system. The first media playback system is associated with a first subscriber to a streaming media service and the first media playback system is physically located in a first commercial establishment. The computing system determines that the first subscriber is associated with one or more first subscriber policies of the streaming media service and sends instructions to play back the first audio tracks on the one or more first playback devices according to the one or more first subscriber policies of the streaming media service.

20 Claims, 7 Drawing Sheets

(51) Int. Cl.
  *H04N 21/2387*    (2011.01)
  *G11B 27/10*      (2006.01)
  *H04N 21/81*      (2011.01)
  *H04N 21/4627*    (2011.01)
  *H04N 21/482*     (2011.01)
  *G06F 16/438*     (2019.01)
  *H04N 21/41*      (2011.01)

(52) U.S. Cl.
  CPC ... *H04N 21/2387* (2013.01); *H04N 21/41265* (2020.08); *H04N 21/43615* (2013.01); *H04N 21/4627* (2013.01); *H04N 21/4825* (2013.01); *H04N 21/8113* (2013.01)

(58) Field of Classification Search
  CPC ........... H04N 21/4627; H04N 21/4825; G11B 27/102; G06F 16/4387
  See application file for complete search history.

(56) References Cited

U.S. PATENT DOCUMENTS

| | | | |
|---|---|---|---|
| 5,761,320 A | 6/1998 | Farinelli et al. | |
| 5,856,827 A | 1/1999 | Sudo | |
| 5,923,902 A | 7/1999 | Inagaki | |
| 6,002,862 A | 12/1999 | Takaike | |
| 6,032,202 A | 2/2000 | Lea et al. | |
| 6,181,316 B1 | 1/2001 | Little et al. | |
| 6,255,961 B1 | 7/2001 | Van et al. | |
| 6,256,554 B1 | 7/2001 | Dilorenzo | |
| 6,404,811 B1 | 6/2002 | Cvetko et al. | |
| 6,469,633 B1 | 10/2002 | Wachter et al. | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,728,531 B1 | 4/2004 | Lee et al. | |
| 6,732,155 B2 | 5/2004 | Meek | |
| 6,757,517 B2 | 6/2004 | Chang et al. | |
| 6,778,869 B2 | 8/2004 | Champion | |
| 6,826,283 B1 | 11/2004 | Wheeler et al. | |
| 6,985,694 B1 | 1/2006 | De Bonet et al. | |
| 7,017,118 B1 | 3/2006 | Carroll | |
| 7,020,048 B2 | 3/2006 | McComas | |
| 7,113,833 B1 | 9/2006 | Brown et al. | |
| 7,117,451 B2 | 10/2006 | Sielken | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,187,947 B1 | 3/2007 | White et al. | |
| 7,236,773 B2 | 6/2007 | Thomas | |
| 7,295,548 B2 | 11/2007 | Blank et al. | |
| 7,312,785 B2 | 12/2007 | Tsu et al. | |
| 7,358,960 B2 | 4/2008 | Mak | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,742,740 B2 | 6/2010 | Goldberg et al. | |
| 7,797,446 B2 | 9/2010 | Heller et al. | |
| 7,805,682 B1 | 9/2010 | Lambourne | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,050,652 B2 | 11/2011 | Qureshey et al. | |
| 8,074,253 B1 | 12/2011 | Nathan | |
| 8,103,009 B2 | 1/2012 | McCarty et al. | |
| 8,131,390 B2 | 3/2012 | Braithwaite et al. | |
| 8,181,022 B2 | 5/2012 | Meyerson | |
| 8,234,395 B2 | 7/2012 | Millington | |
| 8,483,853 B1 | 7/2013 | Lambourne | |
| 8,763,149 B1* | 6/2014 | Cohen .................. | G06F 21/62 726/27 |
| 8,763,157 B2 | 6/2014 | Navar et al. | |
| 9,374,607 B2 | 6/2016 | Bates et al. | |
| 9,462,344 B1* | 10/2016 | Sheedy .............. | H04N 21/6587 |
| 9,495,076 B2 | 11/2016 | Kumar et al. | |
| 9,654,821 B2 | 5/2017 | Coburn, IV et al. | |
| 9,674,587 B2 | 6/2017 | Triplett et al. | |
| 9,684,484 B2 | 6/2017 | Kumar et al. | |
| 9,703,521 B2 | 7/2017 | Kumar et al. | |
| 9,735,978 B2 | 8/2017 | Kumar et al. | |
| 9,798,510 B2 | 10/2017 | Kumar et al. | |
| 9,953,179 B2 | 4/2018 | Kumar et al. | |
| 10,055,491 B2 | 8/2018 | Tripoli et al. | |
| 2001/0042107 A1 | 11/2001 | Palm | |
| 2002/0002039 A1 | 1/2002 | Qureshey et al. | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2002/0165921 A1 | 11/2002 | Sapieyevski | |
| 2002/0178191 A1 | 11/2002 | Sielken | |
| 2002/0188752 A1* | 12/2002 | Tomassetti ....... | H04N 21/43632 709/236 |
| 2003/0023741 A1 | 1/2003 | Tomassetti et al. | |
| 2003/0157951 A1 | 8/2003 | Hasty | |
| 2003/0198257 A1 | 10/2003 | Sullivan et al. | |
| 2003/0210796 A1 | 11/2003 | McCarty et al. | |
| 2004/0024478 A1 | 2/2004 | Hans et al. | |
| 2004/0025185 A1 | 2/2004 | Goci et al. | |
| 2004/0078383 A1 | 4/2004 | Mercer et al. | |
| 2004/0078812 A1 | 4/2004 | Calvert | |
| 2004/0215611 A1 | 10/2004 | Jawa et al. | |
| 2004/0261040 A1 | 12/2004 | Radcliffe et al. | |
| 2005/0028225 A1 | 2/2005 | Dawson et al. | |
| 2005/0108320 A1 | 5/2005 | Lord et al. | |
| 2005/0155072 A1 | 7/2005 | Kaczowka et al. | |
| 2005/0166157 A1 | 7/2005 | Ollis et al. | |
| 2005/0193015 A1 | 9/2005 | Logston et al. | |
| 2005/0262253 A1 | 11/2005 | Li et al. | |
| 2006/0107237 A1 | 5/2006 | Kim | |
| 2006/0168340 A1 | 7/2006 | Heller et al. | |
| 2006/0253782 A1 | 11/2006 | Stark et al. | |
| 2007/0038999 A1* | 2/2007 | Millington .............. | H04L 65/60 718/100 |
| 2007/0067794 A1* | 3/2007 | Russell .............. | H04N 21/6405 725/25 |
| 2007/0124785 A1* | 5/2007 | Marsico ........... | H04N 21/25816 725/105 |
| 2007/0142944 A1 | 6/2007 | Goldberg et al. | |
| 2007/0168540 A1 | 7/2007 | Hansson | |
| 2007/0288470 A1 | 12/2007 | Kauniskangas et al. | |
| 2008/0005690 A1 | 1/2008 | Van Vugt | |
| 2008/0016465 A1 | 1/2008 | Foxenland | |
| 2008/0134256 A1 | 6/2008 | Dacosta | |
| 2008/0209577 A1 | 8/2008 | Vrielink et al. | |
| 2008/0222546 A1 | 9/2008 | Mudd et al. | |
| 2009/0083856 A1* | 3/2009 | Aisu .................... | G11B 27/322 726/26 |
| 2009/0222864 A1 | 9/2009 | Drakoulis et al. | |
| 2009/0228919 A1 | 9/2009 | Zott et al. | |
| 2010/0004768 A1* | 1/2010 | Dunning ................ | G06Q 30/02 700/94 |
| 2010/0036942 A1* | 2/2010 | Quere .................. | H04L 43/0811 709/224 |
| 2010/0082731 A1 | 4/2010 | Haughay et al. | |
| 2010/0095332 A1 | 4/2010 | Gran et al. | |
| 2010/0131567 A1 | 5/2010 | Dorogusker et al. | |
| 2010/0284389 A1 | 11/2010 | Ramsay et al. | |
| 2011/0004669 A1* | 1/2011 | Navar .................. | G06F 21/6209 709/217 |
| 2011/0179455 A1 | 7/2011 | Thompson et al. | |
| 2011/0264530 A1* | 10/2011 | Santangelo ............. | H04L 67/20 370/352 |
| 2011/0264732 A1 | 10/2011 | Robbin et al. | |
| 2011/0311204 A1 | 12/2011 | Adimatyam et al. | |
| 2012/0089699 A1* | 4/2012 | Cholas .................... | G06F 21/10 709/217 |
| 2012/0117586 A1 | 5/2012 | McCoy et al. | |
| 2012/0137252 A1 | 5/2012 | Inai | |
| 2012/0244811 A1 | 9/2012 | Chen | |

(56) References Cited

U.S. PATENT DOCUMENTS

| | | | |
|---|---|---|---|
| 2012/0304233 | A1 | 11/2012 | Roberts et al. |
| 2013/0305385 | A1 | 11/2013 | Korteweg et al. |
| 2013/0311670 | A1 | 11/2013 | Tarbox et al. |
| 2014/0074924 | A1 | 3/2014 | Yim et al. |
| 2014/0149544 | A1 | 5/2014 | Le et al. |
| 2014/0156641 | A1 | 6/2014 | Tripoli et al. |
| 2014/0181199 | A1 | 6/2014 | Kumar et al. |
| 2014/0193017 | A1 | 7/2014 | Fortin et al. |
| 2014/0215224 | A1 | 7/2014 | Navar et al. |
| 2014/0320751 | A1 | 10/2014 | Kondo et al. |
| 2015/0350369 | A1 | 12/2015 | Ilsar et al. |

FOREIGN PATENT DOCUMENTS

| | | |
|---|---|---|
| WO | 200147248 | 6/2001 |
| WO | 200153994 | 7/2001 |
| WO | 2003093950 A2 | 11/2003 |

OTHER PUBLICATIONS

Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Aug. 9, 2017, issued in connection with EP Application No. 15822422.0, 8 pages.
European Patent Office, European Office Action dated Dec. 4, 2019, issued in connection with European Application No. 15822422.0, 7 pages.
Final Office Action dated Mar. 14, 2017, issued in connection with U.S. Appl. No. 14/330,825, filed Jul. 14, 2014, 32 pages.
Final Office Action dated May 18, 2018, issued in connection with U.S. Appl. No. 14/330,825, filed Jul. 14, 2014, 43 pages.
International Bureau, International Preliminary Report on Patentability, dated Jul. 10, 2014, issued in connection with International Application No. PCT/US2012/071212, filed Dec. 21, 2012, 8 pages.
International Searching Authority, International Preliminary Report on Patentability dated Jan. 26, 2017, issued in connection with International Application No. PCT/US2015/040351, filed on Jul. 14, 2015, 10 pages.
International Searching Authority, International Search Report and Written Opinion dated Oct. 29, 2015, issued in connection with International Application No. PCT/US2015/040351, filed on Jul. 14, 2015, 13 pages.
International Searching Authority, International Search Report dated Sep. 30, 2013, issued in connection with International Patent Application No. PCT/US2013/046383, filed on Jun. 18, 2013, 3 pages.
International Searching Authority, Written Opinion dated Sep. 30, 2013, issued in connection with International Patent Application No. PCT/US2013/046383, filed on Jun. 18, 2013, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Aug. 10, 2016, issued in connection with U.S. Appl. No. 14/330,825, filed Jul. 14, 2014, 28 pages.
Non-Final Office Action dated Feb. 11, 2019, issued in connection with U.S. Appl. No. 14/330,825, filed Jul. 14, 2018, 14 pages.
Non-Final Office Action dated Aug. 31, 2017, issued in connection with U.S. Appl. No. 14/330,825, filed Jul. 14, 2014, 30 pages.
Notice of Allowance dated Aug. 15, 2019, issued in connection with U.S. Appl. No. 14/330,825, filed Jul. 14, 2014, 9 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
"Welcome. You're watching Apple TV." Apple TV 1st Generation Setup Guide, Apr. 8, 2008 Retrieved Oct. 14, 2014, 40 pages.
"Welcome. You're watching Apple TV." Apple TV 2nd Generation Setup Guide, Mar. 10, 2011 Retrieved Oct. 16, 2014, 36 pages.
"Welcome. You're watching Apple TV." Apple TV 3rd Generation Setup Guide, Mar. 16, 2012 Retrieved Oct. 16, 2014, 36 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, Summons to Attend Oral Proceedings mailed on Nov. 27, 2020, issued in connection with European Application No. 15822422.0, 7 pages.

* cited by examiner

POLICIES FOR MEDIA PLAYBACK

CROSS-REFERENCE TO RELATED APPLICATIONS

This application claims priority under 35 U.S.C. § 120 to, and is a continuation of, U.S. non-provisional Patent application Ser. No. 14/330,825, filed on Jul. 14, 2014, entitled "Policies for Media Playback," which is incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
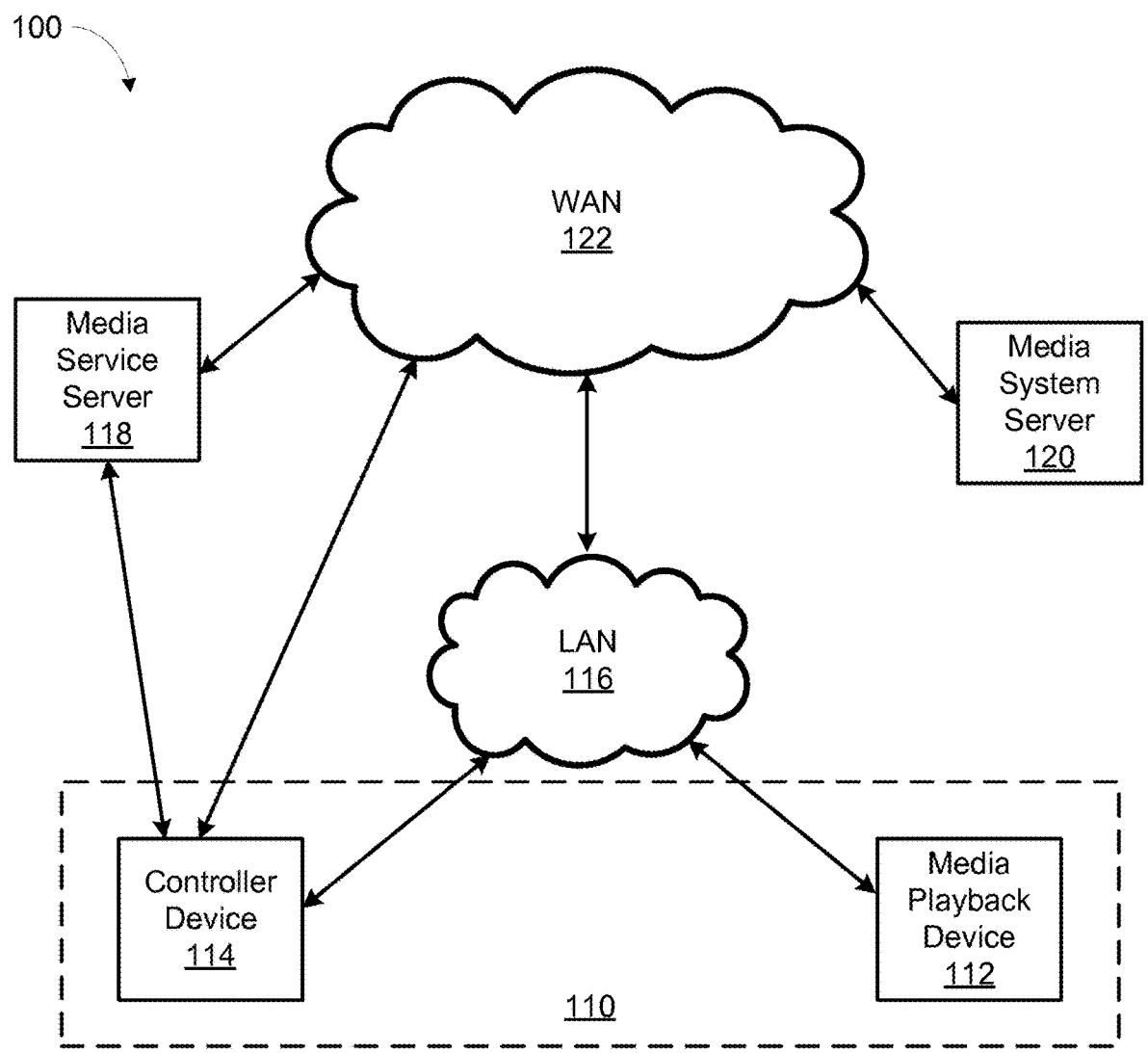
FIG. 1 shows an example network configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

According to examples described herein, one or more policies may be applied to media items that are played back by a media playback system via a media application of a media service providing the media items. Such policies may help enforce the media service's playback restrictions when a user is playing back media at the media playback system using a media application of the media service.

Media services (e.g., Pandora® Radio, Spotify®, Slacker® Radio, Google Play™, iTunes Radio℠, and others) are a popular source of media for playback on media playback devices. Some media service providers may offer media application software that allows a user to stream media from the media service provider to the user's computing device(s) for playback. In particular, some media applications allow a user to stream media to the user's portable device(s), thereby allowing the user to listen to media from corresponding media service providers almost anywhere.

However, some media services do not allow unfettered listening to their media. Some media services generally control a user's playback experience (e.g., by managing the extent to which a user may control playback) and such restrictions may apply when a user is using such media services' media applications. For example, some media services manage the number of media items a user may skip over a given duration of time or prevent a user from returning to a previously played media item, among other examples.

In examples, some media applications offered by media services may at times operate as controller applications that allow a user to forward media available from a given media service provider to a media playback system. For instance, such an application may allow a user to listen to music on her smartphone while walking down the street and then allow the user to transfer playback of the music to her home media playback system once her smartphone connects with the home system. As mentioned above, a media service may manage how a user plays back media from the media service. In some cases, the home media playback system may similarly manage the user's playback control options by applying and enforcing one or more policies.

In examples described herein, a computing device of a media playback system (e.g., a playback device of the media playback system) may receive a request to playback media. That media may be from a playlist that is associated with a media application. For example, a media service may offer a set of media items in a particular order (e.g., a "playlist") that may be accessed by the media application that may in turn provide those media items or network locaters of those media items to the playback device. The set of media items may be curated by the media service, a third party service (e.g., a curator service), or by a user of the media application, among other examples.

After receiving the request to playback the media, the playback device may determine what, if any, policies related to the playback of media items should apply to the media. In general, a policy modifies the behavior of a media playback system while playing back media relative to the behavior without the policy. A given policy may affect playback functions or options, display aspects during playback of media, and/or handling of events that are detected during playback of media, among other examples.

To make this determination, the playback device may determine that certain policies correspond to the given media application that is associated with the playlist from which the media came from. As discussed above, some media services place restrictions on the playback of media, and accordingly, the playback device may determine policies that correspond to these restrictions. It should be understood that a unique set of policies may apply to each media application or perhaps the same set of policies may apply to multiple media applications.

Moreover, the playback device may apply additional policies to the media based on a number of characteristics of the media. Example characteristics may include a type or form of the media, a source of the media, or media-item characteristics (e.g., album, artist, record label, etc.), among other examples.

After determining that one or more policies apply, the playback device may apply the policies to all or a portion of the media identified in the playback request. That is, while policies may generally apply to all media from a playlist that is associated with a media application, some policies may apply only to particular media items.

The playback device may then generate a playback queue that includes some or all of the media from the playlist that is associated with the media application as well as the applied policies. The playback device may then cause playback of the media in accordance with the applied policies.

As a result of the applied policies, one or more aspects related to playback may be modified compared to playback that is unfettered with policies. For example, some playback controls may be disabled on a controller interface, or some playback information or graphics may be displayed or not displayed because of a policy.

Moreover, while some policies may affect playback in a manner that may be readily noticeable by a user, some policies may affect internal operations of the media playback system during media playback. In particular, some policies may dictate how a playback device handles certain events that may occur while media is played back. For instance, a policy may dictate the operations that are performed when playback is paused or stopped or when a playback error is detected, among other examples.

Consequently, the examples described herein may help enforce a media service's playback restrictions when a user is playing back media at a media playback system using a media application of the media service. In this way, the user may enjoy playing back media using her media playback system, while the media service's playback restrictions are honored.

As indicated above, examples provided herein are directed to policies related to playback of media items. In one aspect, a method is provided. The method involves: (a) receiving, by a computing device of a media playback system, a request to playback one or more media items that are from a playlist associated with a controller application, (b) applying to the one or more media items one or more playback policies that are associated with the controller application, where a given playback policy restricts at least one aspect of playback of at least one of the one or more media items, and (c) causing playback of the one or more media items in accordance with the one or more playback policies.

In another aspect, a computing device is provided. The computing device includes at least a network interface configured to communicatively couple the computing device to a media playback system, a graphical display, a non-transitory computer-readable medium, and program instructions stored on the non-transitory computer-readable medium that are executable by at least one processor to cause the computing device to: (a) a request to playback one or more media items that are from a playlist associated with a controller application, (b) apply to the one or more media items one or more playback policies that are associated with the controller application, where a given playback policy restricts at least one aspect of playback of at least one of the one or more media items, and (c) causing playback of the one or more media items in accordance with the one or more playback policies.

In yet another aspect, a non-transitory computer-readable medium is provided. The non-transitory computer-readable medium having instructions stored thereon that are executable by a computing device of a media playback system to cause the computing device to perform functions, the functions including: (a) receiving a request to playback one or more media items that are from a playlist associated with a controller application, (b) applying to the one or more media items one or more playback policies that are associated with the controller application, where a given playback policy restricts at least one aspect of playback of at least one of the one or more media items, and (c) causing playback of the one or more media items in accordance with the one or more playback policies.

In one other aspect, a method is provided. The method involves: (a) receiving, by a computing device of a media playback system, a request to playback one or more media items that are from a playlist associated with a controller application, and (b) causing a graphical display to display a playback interface in accordance with one or more display policies that are associated with the controller application, where a given display policy restricts at least one aspect of display when one of the one or more media items is played back.

In another aspect, a computing device is provided. The computing device includes at least a network interface configured to communicatively couple the computing device to a media playback system, a graphical display, a non-transitory computer-readable medium, and program instructions stored on the non-transitory computer-readable medium that are executable by at least one processor to cause the computing device to: (a) receive a request to playback one or more media items that are from a playlist associated with a controller application, and (b) cause the graphical display to display a playback interface in accordance with one or more display policies that are associated with the controller application, where a given display policy restricts at least one aspect of display when one of the one or more media items is played back.

In yet another aspect, a non-transitory computer-readable medium is provided. The non-transitory computer-readable medium having instructions stored thereon that are executable by a computing device of a media playback system to cause the computing device to perform functions, the functions including: (a) receiving a request to playback one or more media items that are from a playlist associated with a controller application, and (b) causing a graphical display to display a playback interface in accordance with one or more display policies that are associated with the controller application, where a given display policy restricts at least one aspect of display when one of the one or more media items is played back.

In yet one other aspect, a method is provided. The method involves: (a) causing, by a computing device of a media playback system, playback of a media item from a playlist associated with a controller application, (b) during playback of the media item, detecting a playback event, and (c) managing the detected playback event in accordance with one or more playback-event policies that are associated with the controller application.

In another aspect, a computing device is provided. The computing device includes at least a network interface configured to communicatively couple the computing device to a media playback system, a graphical display, a non-transitory computer-readable medium, and program instructions stored on the non-transitory computer-readable medium that are executable by at least one processor to cause the computing device to: (a) cause playback of a media item from a playlist associated with a controller application, (b) during playback of the media item, detect a playback event, and (c) manage the detected playback event in accordance with one or more playback-event policies that are associated with the controller application.

In yet another aspect, a non-transitory computer-readable medium is provided. The non-transitory computer-readable medium having instructions stored thereon that are executable by a computing device of a media playback system to cause the computing device to perform functions, the functions including: (a) causing playback of a media item from a playlist associated with a controller application, (b) during playback of the media item, detecting a playback event, and (c) managing the detected playback event in accordance with one or more playback-event policies that are associated with the controller application.

It will be understood by one of ordinary skill in the art that this disclosure includes numerous other embodiments.

II. Example Network Configuration

FIG. 1 shows an example network configuration 100 in which one or more embodiments disclosed herein may be practiced or implemented. As shown, the network configuration 100 may include a media playback system 110, a media service server 118, and a media system server 120. The media playback system 110 may include a media playback device 112 (or simply, a "playback device") and a computing device 114 that runs a controller application (referred herein as a "controller device"), among other devices. The devices of the media playback system 110 may be communicatively coupled via a local area network ("LAN") 116, discussed in further detail below. The LAN 116 may be in communication with a Wide Area Network ("WAN") 122. It should be understood that the network configuration 100 may include multiple of the aforementioned network elements and/or additional elements not illustrated.

The WAN 122 may include the Internet and/or one or more cellular networks, among other networks. The WAN 122 may communicatively couple the various network elements of the network configuration 100. In such an arrangement, the media playback system 110 may communicate with the media service server 118 and/or the media system server 120 via the WAN 122. In particular, the media playback system 110 may communicate with the other network elements via the LAN 116 that may be communicatively linked to the WAN 122. Moreover, the controller device 114 may communicate with the media service server 118 indirectly via the WAN 122 or perhaps directly. Notably, the controller device 114 may communicate with the media service server 118 without utilizing the LAN 116. That is, the controller device 114 may communicate with the media service server 118 (or other network elements) as a device that is independent from the media playback system 110.

Generally speaking, the media playback system 110 may be any type of media playback system configured to receive and transmit data over a data network and playback media items. In practice, the media playback system 110 may include one or more playback devices in addition to the playback device 112, as well as additional computing devices. Such a media playback system is discussed in further detail below with reference to example media playback system 200.

The controller device 114 may be a computing device on which media application software may be installed, such as for example, an iPhone™, iPad™ or any other smart phone, tablet, or network device (e.g., a networked computer such as a PC or Mac™). The media application may be operable to cause the controller device 114 to obtain and playback media from a given media service provider. Furthermore, the media application may be operable to cause media from the given media service provider to be transmitted to the media playback device 112 for playback while the controller device 114 is part of the media playback system 110 (e.g., when the controller device 114 is within the coverage area of the LAN 116). In such an operating state, the media application may be referred herein as a "controller application."

In practice, for example, a user may utilize a given media application in the following manner. The user may be walking down the street with her iPhone™ that includes a media application (e.g., a Google Play™ application, among others) that is installed on the iPhone™ The user may decide that she wants to listen to music, and she may launch the media application. In turn, the media service server 118 may transmit music to the iPhone™ via a cellular network (e.g., the WAN 122). The user may be listening to a given song when she enters her home and comes within the coverage area of her Wi-Fi network (e.g., the LAN 116). The media application may detect that the media playback system 110 is present on the Wi-Fi network and may cause a display on the iPhone™ to provide to the user an option to play the currently playing music through the media playback system 110. The user may in turn interact with the iPhone™ and cause, for example, the media service server 118 to transmit the music to the playback device 122 for playback.

A given media application may be unique to a given media service provider. That is, a given media service provider may provide its own media application. Moreover, a given media service provider may provide multiple versions of its media application. Such versions may be platform specific (e.g., iOS™ and Android™ versions, among other possibilities). The controller device 114 may obtain the media application from a service provider (e.g., the service provider associated with the media service server 118).

The media service server 118 may include a network interface, a processing unit, and data storage, all of which may be communicatively linked together by a system bus, network, or other connection mechanism. The network interface may facilitate data flow between the media service server 118 and other network elements on the WAN 122. The processing unit may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may then include program instructions that are executable by the processing unit to carry out various functions described herein.

Moreover, the media service server 118 may be configured to store media items (e.g., a media library) and/or access such media items to transmit to a playback device and/or a controller device. The media service server 118 may also be configured to create or obtain metadata related to the media items, as well as store such metadata. Further, the media service server 118 may be configured to store and/or access media application software and provide such software to computing devices, such as the controller device 114.

In practice, the media service server 118 may be configured to provide media content to the media playback system 110 and/or the controller device 114. In particular, the media service server 118 may provide streaming media and/or media downloads, among other examples. The media service server 118 may provide "Internet radio" service and/or "on-demand" service (e.g., where a user may request a particular media item), among other service types, to one or both of the media playback system 110 and the controller device 114. When the media service server 118 provides media to the media playback system 110 and/or the controller device 114, the media service server 118 may provide metadata along with the media.

The media system server 120 may include a network interface, a processing unit, and data storage, similar to those of the media service server 118. In example implementations, the data storage may also include a database that may contain policy data indicating one or more policies that are related to playback of media by a media playback system. In general, a policy is a mechanism that is configured to cause a media playback system to operate in a different manner when playing back media compared to operation without the policy. A given policy may affect playback functions or options, display aspects, and/or handling of events that are detected during playback of media, among other examples.

The media system server 120 may receive the policy data in a number of ways. In example implementations, the media system server 120 may receive the policy data from one or more of the other network elements. For example, the media service server 118 may provide the media system server 120 policy data for one or more media applications that are associated with the media service server 118. Other media service servers (not shown) may provide the media system server 120 policy data for their respective media applications in a similar manner. In other implementations, the media system server 120 may receive the policy data from an administrator computer (not shown) that itself may receive policy data from a peripheral device, such as a keyboard, touchpad, or the like. In turn, the media system server 120 may transmit policy data to other network elements, such as the media playback device 112.

The policy data may be stored in the database in the form of a table or the like. In certain implementations, the one or more policies may be stored in the database based on the particular controller application that the policy applies to, among other considerations. Policies related to playback of media are discussed in further detail below.

III. Example Media Playback System

Figure 2:
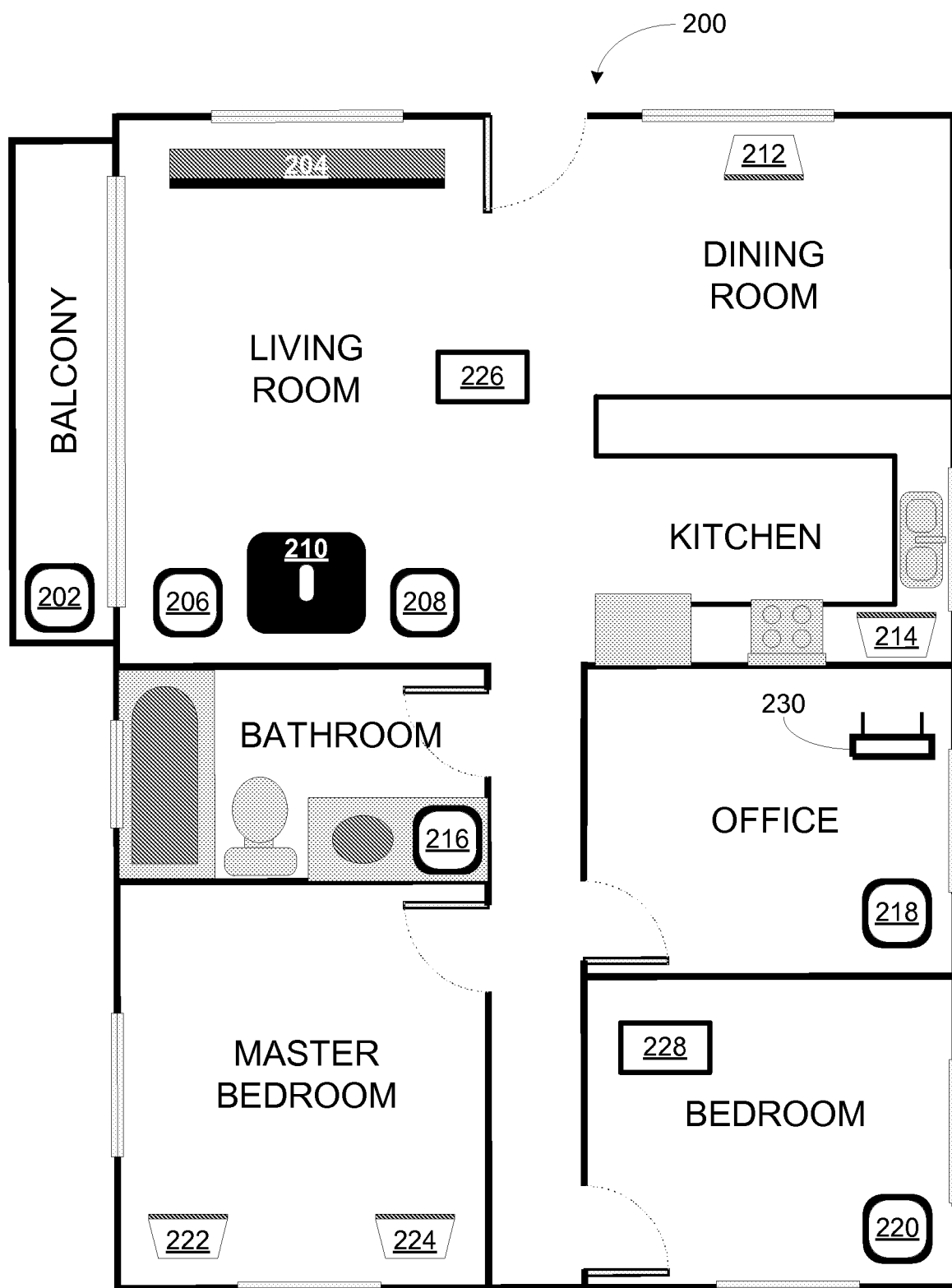
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, control devices 226 and 228, and a wired or wireless network router 230.

Further discussions relating to the different components of the example media playback system 200 and how the different components may interact to provide a user with a media experience may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
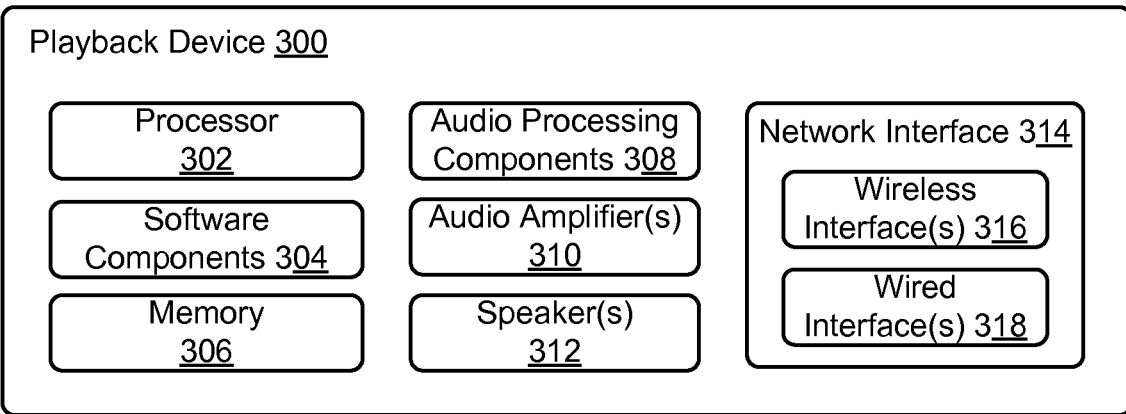
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other embodiments are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s), controller device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some embodiments include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some embodiments, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
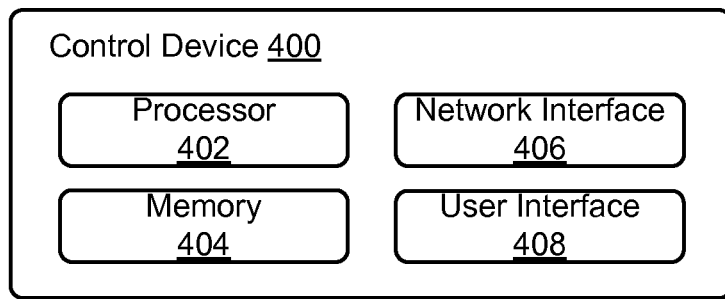
FIG. 4 shows a functional block diagram of an example control device.

FIG. 4 shows a functional block diagram of an example control device 400 that may be configured to be one or both of the control devices 226 and 228 of the media playback system 200. As shown, the control device 400 may include a processor 402, memory 404, a network interface 406, and a user interface 408. In one example, the control device 400 may be a dedicated controller for the media playback system 200. In another example, the control device 400 may be a network device on which media playback system controller application software may be installed, such as for example, an iPhone™, iPad™ or any other smart phone, tablet or network device (e.g., a networked computer such as a PC or Mac™). In yet another example, the control device 400 may be a network device with a media application installed that may be operable to cause the control device 400 to obtain media (e.g., from a given media service provider associated with the media application) independent from a media playback system and may also be operable as a control device of a media playback system. Such a control device may be referred herein as a "controller device."

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
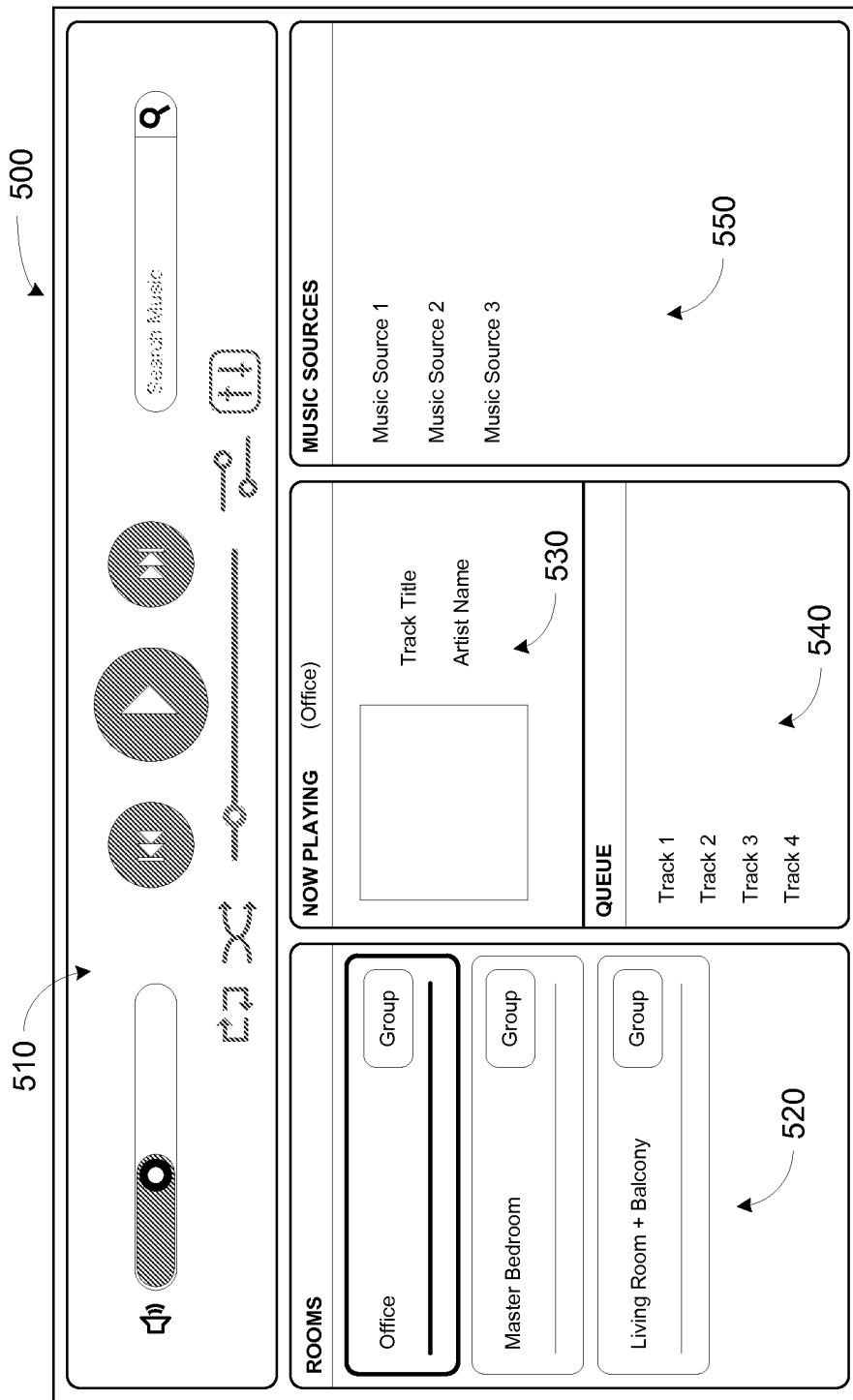
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 500 of FIG. 5, the graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some embodiments, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Methods for Policies Related to Playback of Media Items

As discussed above, in some examples, one or more policies may be applied to media items that are played back by a media playback system via a media application of a media service providing the media items.

Figure 6:
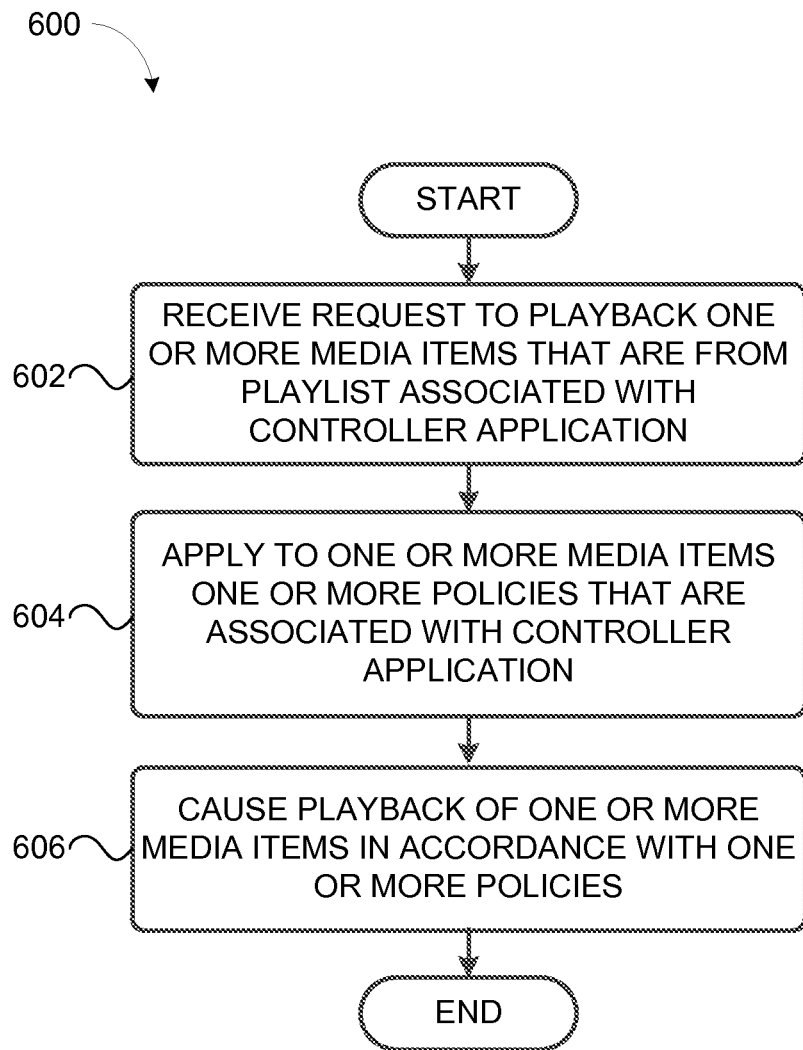
FIG. 6 shows a flow diagram of an example method.
Figure 8:
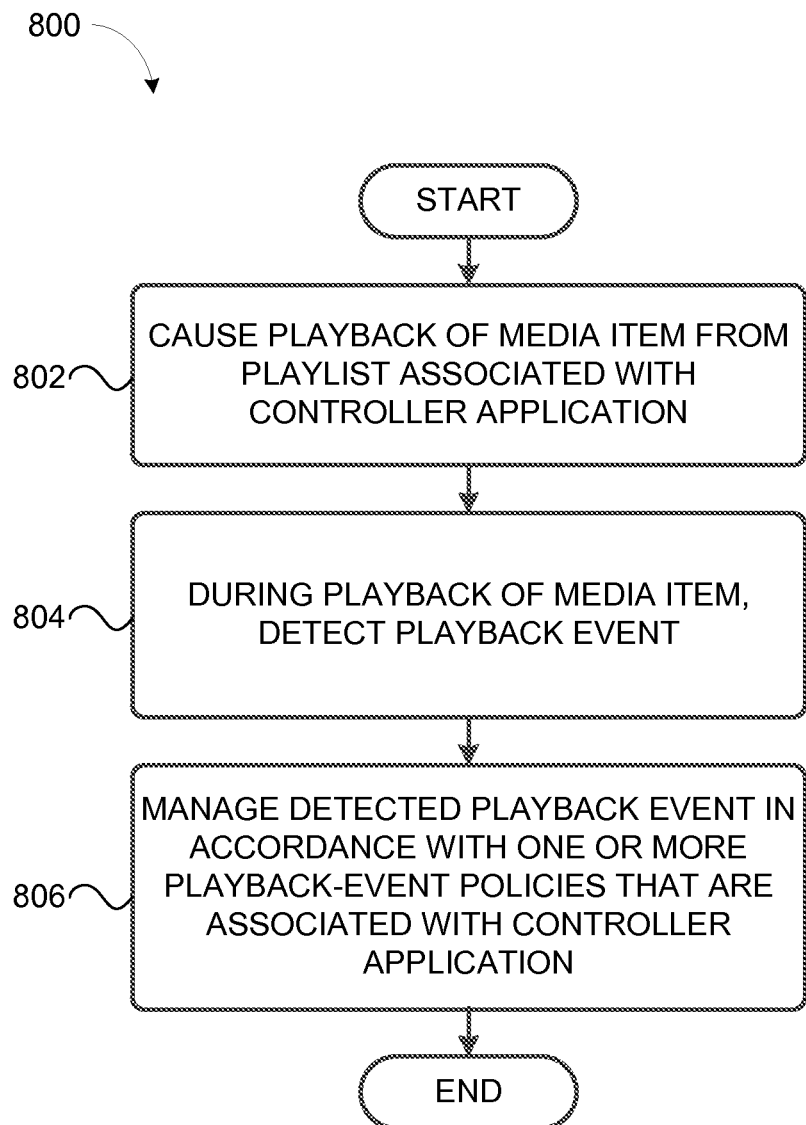
FIG. 8 shows a flow diagram of an example method.

For method 600 of FIG. 6, method 800 of FIG. 8, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the methods 600, 800, and other processes and methods disclosed herein, each block in FIGS. 6, and 8 may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

Figure 7:
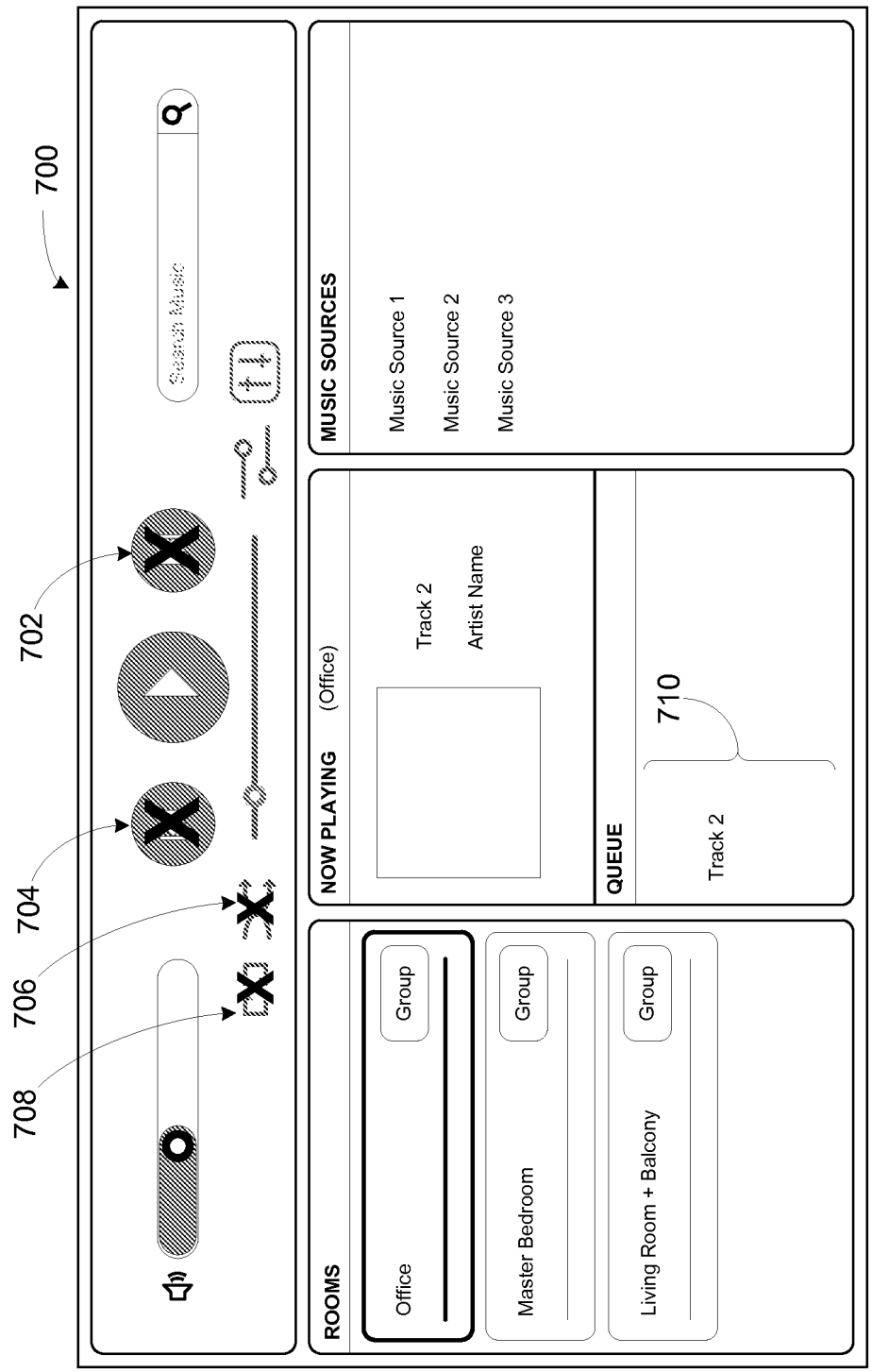
FIG. 7 shows an example controller interface in accordance with one or more policies related to playback of media items.

For clarity, the methods may be described herein with reference to FIGS. 1, 5 and FIG. 7. It should be understood, however, that this is for purposes of example and explanation only and that the operations of the methods should not be limited by these figures.

1. Example Methods for Applying & Enforcing Policies

The method 600 shown in FIG. 6 presents an embodiment of a method that may be implemented within the network configuration 100 by a playback device of the media playback system 110. It should be understood that the method may be carried out in other suitable network configurations and/or by other suitable network elements as well. Method 600 may include one or more operations, functions, or actions as illustrated by one or more of blocks 602-606.

The method 600 begins at block 602 with receiving, by a computing device of a media playback system, a request to playback one or more media items that are from a playlist associated with a controller application. At block 604, the method 600 involves applying to the one or more media items one or more policies that are associated with the controller application. At block 606, the method 600 involves causing playback of the one or more media items in accordance with the one or more policies. The blocks shown in FIG. 6 are discussed in further detail below.

a. Receiving Request to Playback Media Item(s) that are from Playlist Associated with Controller Application The method 600 begins at block 602 with receiving, by a computing device of a media playback system, a request to playback one or more media items that are from a playlist associated with a controller application. In practice, the computing device of the media playback system may be a playback device (e.g., the playback device 112), among other devices. The playback device may receive the request to playback the media from another computing device communicatively coupled to the playback device. For example, the playback device 112 may receive such a request from an additional playback device, a control device (e.g., a dedicated control device), a controller device (e.g., the controller device 114), or a server (e.g., the media system server 120), among other possibilities.

In practice, the request to playback the one or more media items that are from the playlist associated with the controller application may be a result of the controller device 114 detecting a selection of a playback option that is provided by the controller application. For example, as discussed above, a user may be using her smartphone to listen to music from a media service provider via a media application installed on the smartphone. The music may be part of a playlist that is provided by the media service provider. The playlist may be created or otherwise curated by the media service provider, a third party service (e.g., a curator service), or by the user of the media application, among other examples. When the user enters her home that has a media playback system (e.g., the media playback system 110) setup on her home Wi-Fi network (e.g., the LAN 116), the media application may cause the smartphone to join the media playback system 110.

The media application may provide the user an option to playback the music from the media service provider through the media playback system 110. The user may select the option, thereby causing the media playback application to transition into operating as a controller application, and cause the smartphone to transmit to the media playback device 112 the request to playback the music.

The request to playback the one or more media items that are from the playlist associated with the controller application may take various forms. In general, such a request may include respective identifiers of the one or more media items, such as URIs or URLs, or perhaps of the whole playlist. In the general case, the playback device may receive the request and determine from the identifiers that the one or more media items are from the playlist associated with the controller application. For example, the playback device may use the identifiers to reference a playlist database, among other examples.

In another example, the request may also include information regarding one or more characteristics of the one or more media items. Such information may be included in the request in a number of ways. For example, in metadata included with the request or perhaps the identifiers of the one or more media items may themselves include information reflecting the one or more characteristics. In any event, the playback device may determine the one or more characteristics based on the request. For example, by detecting information included in the request or by referencing one or more databases.

In general, the one or more characteristics of the one or more media items may identify media-item specific characteristics or characteristics shared by the one or more media items. Example characteristics include a source of the media (e.g., an identifier of a media service provider, a local media source, etc.), a playlist that the media is part of (e.g., a playlist associated with a controller application), a type or form of media (e.g., programmed Internet radio, streaming radio, etc.), and media-item characteristics (e.g., artist name, album name, record label, etc.). Other examples are also possible.

As discussed above, the controller application may correspond to a given media service provider and may be used to obtain media from the given media service provider. As also discussed above, a media service provider may provide media items in various forms to its subscribers. Such forms may include media items identified by playlists, programmed Internet radio, and streaming radio, among other forms. A given playlist may identify a plurality of media items (e.g., music tracks) in a particular order. In example implementations, the controller application may obtain a playlist from a media service provider or curator service. In examples, a user may have created, edited, or otherwise modified a playlist (e.g., via a media application, a media service provider's webpage, or the like) that was then stored by the media service provider.

In any event, after the controller application obtains, creates, and/or modifies a playlist, that playlist is associated with the controller application. The controller application may then provide an indication and/or respective network locations of the media items identified by the playlist to other devices of the media playback system 110. When the controller application performs such functions, the controller application may also provide a controller application identifier identifying that the playlist is associated with the controller application.

b. Applying to Media Item(s) One or More Policies that are Associated with Controller Application At block 604, the method 600 involves applying to the one or more media items one or more policies that are associated with the controller application. One or more additional functions may be performed before this function is performed.

In some implementations, before applying the one or more policies, the playback device may determine what, if any, policies apply to the one or more media items. The playback device may make such a determination in a number of ways.

In some examples, the playback device may receive policy information from the controller device. For example, the media application may cause the controller device 114 to transmit to the playback device 112 policy information when the media application is running and operating as a controller application. In some cases, the media application may cause the controller device 114 to provide policy information the first time that the controller device 114 joins the media playback system 110 and then perhaps, the media application may cause the controller device 114 to provide updated policy information periodically or when a policy is modified or added by the corresponding media service provider. Other examples are also possible.

In other examples, the playback device may extract information from the received request from block 602 and reference a policies table. The policies table may be stored on the playback device or on a device that is communicatively coupled with the playback device (e.g., the media system server 120). The policies table may include policy data indicating one or more policies that are related to playback of media by a media playback system. The table may be formatted in such a manner that the playback device may search for policies based on a controller application identifier, a playlist identifier, a media item identifier and/or any of the other characteristics discussed above. For example, the playback device may use a controller application identifier to determine what policies are associated with the identified media application provided by a given media service.

In other examples, the playback device may determine what policies apply to the one or more media items by detecting policy data included in the received request. Similarly, in yet other examples, the playback device may perform this function by detecting policy data included with the one or more media items when the playback device obtains the one or more media items from a media source. In some examples, one or more default policies may apply unless the playback device determines that a default policy should be disabled or modified. Other possibilities also exist.

After determining what policies apply to the one or more media items, the playback device may then determine the scope of the policies. In example implementations, a policy may apply to each of the one or more media items or a policy may apply to particular media items. The scope of a given policy may be based on many considerations. For example, the scope of a policy may be based on the policy itself or on any of the one or more characteristics of the media items discussed above. For instance, a playback device may determine one or more media-item characteristics of a given media item, such as a record label, and then apply a policy to the given media item based on the media-item characteristic(s).

In example implementations, a first policy may apply to each media item based on one characteristic, and a second policy may apply to particular media items based on another characteristic. For example, a first policy may apply to each of the one or more media items based on the media items being part of a playlist associated with a given controller application, and a second policy may apply to only some of the one or more media items based on, for example, an album name corresponding to those media items. Other examples are also possible.

In any event, the playback device may apply to the one or more media items one or more policies that are associated with the controller application. As discussed above, broadly speaking, a policy is a mechanism that modifies a state of operation of a media playback system relative to that state of operation without the policy. There are many types of policies that may be applied to the one or more media items.

One type of policy may take the form of a playback policy that affects one or more aspects of playback of one or multiple media items. Similarly, a media-item playback policy may affect at least one aspect of playback of a particular media item. That is, a media-item playback policy is a playback policy with a per-track scope. In example implementations, a given playback policy may restrict or perhaps prevent certain aspects of playback that would otherwise be unrestricted.

Many playback policies are possible. For example, a given playback policy may affect (i) modifying (e.g., shuffling) a predetermined playback order of the one or more media items, (ii) skipping playback of one of the one or more media items, (iii) replaying a previously played media item of the one or more media items, (iv) seeking forward during playback of one of the one or more media items, (v) seeking backward during playback of one of the one or more media items, and/or (vi) replaying a currently playing media item of the one or more media items (e.g., "repeat"), among other possibilities.

A policy that restricts an aspect of playback may limit the extent to which a certain playback operation may be performed. For example, a playback policy that restricts modifying a predetermined playback order may limit the number of times a playback order may be modified (e.g., a limit on "shuffles"), the number of individual media items that may be re-ordered, etc. In another example, a playback policy that restricts replaying a previously played media item or a currently playing media item may restrict the number of replays that may occur in a predetermined amount of time. Similarly, a playback policy that restricts skipping playback of a media item may restrict the number of media items skips that may occur in a predetermined amount of time. In yet other examples, a playback policy that restricts seeking forward or backward during playback of a media item may restrict the speed at which seeking occurs or perhaps the duration of time that seeking may occur (e.g., seeking restricted to 10 seconds at a time). It should be understood that the aforementioned examples are provided merely for explanatory purposes and should not be construed as limiting. Other playback policies are also possible.

On the other hand, a policy that prevents an aspect of playback may prohibit a playback operation altogether. In example implementations, when a playback policy prevents a given playback operation and an application and/or a device attempts to cause a playback device to perform the given playback operation, an error message may be generated.

Another type of policy may take the form of a display policy that affects at least one aspect of a playback interface when a media item is played back. Similar to the playback policies, display policies may apply to each of the one or more media items or particular media items. Further, a given display policy may modify, restrict, or prevent certain aspects of display during playback of media that would otherwise be unrestricted.

Numerous display policies are possible. A given display policy may affect how one or more aspects of a playback interface (e.g., the controller interface 500) are displayed while a media items is played back by the media playback system 110. In particular, a display policy may affect how playback information (e.g., "now playing" or "next track" information such as track title, album title, artist name, etc.), playback controls, or other playback graphics are displayed. For example, the one or more media items may have a playback order (e.g., according to the playlist associated with the controller application) where playback of a first media item is followed by playback of a second media item that itself is followed by playback of a third media item and so forth. A given display policy may restrict or perhaps prevent display of playback information related to the second media item when the first media items is played back.

To illustrate, referring to FIG. 5, such a display policy may affect what information is displayed in the playback queue region 540 when a given track is played. For instance, when Track 1 is played, the display policy may prevent displaying what track or tracks are intended to play subsequent to Track 1. In another example, when Track 2 is played, the display policy may restrict the display of the playback queue region 540 to show only that Track 1 was previously played or perhaps the display policy may prevent showing any other tracks altogether. Other examples of display policies are also possible.

In other examples, a display policy may affect the display of an advertisement that is displayed during playback. For example, a display policy may control the location, size, color, etc. of an advertisement that is displayed on a playback interface. The advertisement may be associated with the media service provider that provides the media application.

Other types of policies may take the form of playback-event policies. Broadly speaking, a playback-event policy affects at least one aspect of an operation that a playback device performs when a playback event is detected. That is, a playback-event policy affects how a playback device manages a detected playback event.

In general, a playback event may be any event that occurs at a media playback system that is related to the playback of media by the media playback system. For example, a given playback event may include (i) a playback error, (ii) a playback paused state, (iii) a playback stopped state, or (iv) an end of a playback queue ("last-item event"), among other examples.

Accordingly, a given playback-event policy may affect at least one aspect of an operation that occurs upon detecting a playback event. For example, a playback-error policy may cause a playback device to enter a playback paused or stopped state and not play a new media item (e.g., the next media item in the playback queue). Another example of a playback-error policy may cause a playback device to obtain at least a portion of a media item that is currently playing when a playback error is detected (e.g., the portion of the media item that has yet to be played). A playback-paused or playback-stopped state policy may cause a playback device to re-determine a media item locater and/or store in an audio cache a buffered portion of a media item that is currently playing when a playback pause or stop is detected. A last-item event policy may cause a playback device to stop playback and empty a playback queue when a last-item event is detected. Other playback-event policies are also possible.

Other types of policies are also possible. For example, a given policy may cause commands received by a control device (e.g., via a controller interface) to be forwarded to a controller device. In particular, a policy may cause playback commands (e.g., skip to next media item, return to previous media item, play media item, enter paused state, etc.) received by a control device to be forwarded to a controller device (e.g., the controlled device 114). It should be understood that the above-mentioned policies are but a few possible policies that may be utilized and should not be construed as limiting.

After the playback device applies to the one or more media items the one or more policies that are associated with the controller application, the playback device may then generate a playback queue that includes the one or more media items as well as the applied policies. In other examples, the playback queue may have already been generated and the playback device may then apply the one or more policies to the playback queue (e.g., perhaps to the whole playback queue or to individual media items of the playback queue). In any event, the playback device may generate the playback queue by obtaining the one or more media items or perhaps obtaining respective network locators of the one or more media items. The playback device may then store the applied policies such that, when the one or more media items are played back, the one or more media items are played back in accordance with the applied policies.

c. Causing Playback of Media Item(s) in Accordance with One or More Policies

Returning to FIG. 6, at block 606, the method 600 involves causing playback of the one or more media items in accordance with the one or more policies. In general, causing playback of the one or more media items in accordance with the one or more policies may involve playing back media, modifying one or more display aspects related to the play back of media, and/or handling detected playback events in accordance with the one or more policies. It should be understood that such operations are based on the type of policies that were applied in block 604 as well as their respective scope.

In practice, causing playback of the one or more media items in accordance with the one or more policies may involve the playback device 112 causing playback of the media at the playback device itself and/or at one or more other playback devices of the media playback system 110 in accordance with the one or more policies. In an example where the playback device 112 causes playback of the media at another playback device, the playback device 112 may transmit appropriate playback signals sent over the LAN 116 and/or the WAN 122.

Moreover, causing playback of the one or more media items in accordance with the one or more policies may involve the playback device causing one or more control or controller devices of the media playback system 110 to display a controller interface (e.g., playback controls and/or information) in accordance with the one or more policies that are associated with the controller application. For example, the playback device 112 may transmit to a control device or the controller device 114 display commands that affect display of a controller interface.

As noted above, causing playback of the one or more media items in accordance with the one or more policies is dependent on the one or more policies that apply to the one or more media items. In example implementations where a playback policy applies to the one or more media items, causing playback in accordance with the playback policy may involve disabling one or more playback options or functions that would otherwise be available. There are numerous playback options or functions that may be disabled via a playback policy. Example playback options or functions include shuffle the playback order, skip playback of a media item (e.g., skip forward or backward in a playback queue), seek forward or backward while playing a media item, or replay a media item (e.g., a currently playing media item or a previously played media item), among others.

In some implementations, a playback policy may also affect aspects of display when a media item is played back that the playback policy applies to. That is, some playback policies may include one or more display policies. As such, a given playback policy may affect the display of certain aspects of a playback interface (e.g., the controller interface 500) while the media items are played back.

To illustrate, compare FIG. 7, which depicts a controller interface 700 that is displayed while media is played back in accordance with one or more policies, to FIG. 5, which depicts the controller interface 500 that is displayed while media is played back without any policies. As shown in FIG. 7, one or more playback policies affect the display and selectability of certain control icons. In particular, fast forward/skip-to-next icon 702, rewind/skip-to-previous icon 704, shuffle icon 706, and repeat icon 708 are all displayed with an indication that they are disabled and are not selectable.

Notably, the control icons may be displayed in accordance with the one or more playback policies in a number of different ways. For example, the control icons may instead be "grayed out" or perhaps the control icons may not be displayed altogether. It should be understood that in some implementations, playback policies may only affect some or perhaps none of these control icons.

Moreover, in some implementations, the control icons may be displayed with an indication that they are disabled but nonetheless remain selectable. In the event a control device detects a selection of one of the disabled control icons, an error message may be displayed on the controller interface. Other examples are also possible.

In example implementations where a display policy applies to the one or more media items, causing playback in accordance with the display policy may involve modifying, restricting, and/or preventing at least one aspect of display when one of the one or more media items is played back. As discussed above, according to some examples, a given display policy may affect how one or more aspects of a playback interface (e.g., the controller interface 500) are displayed. Returning to FIG. 7, and again comparing FIG. 7 with FIG. 5, one or more display policies affect the display of playback information 710. As shown, the playback information 710 only shows the current track that is playing and does not show the previously played track or the tracks that are next in the playback order. Such a display may be caused by the playback device transmitting to the control device empty display parameter sets for media items other than the currently playing media item. In particular, causing playback of the one or more media items in accordance with the one or more policies may involve the playback device generating respective empty display parameter sets corresponding to media items other than the currently playing media item and transmitting these parameter sets to the control device. Other examples are also possible.

In yet other example implementations where a playback-event policy applies to the one or more media items, causing playback in accordance with the playback-event policy may cause the playback device to perform one or more functions while media is played back.

For example, referring now to FIG. 8, method 800 includes one or more operations, functions, or actions as illustrated by one or more of blocks 802-806 that may occur during playback in accordance with playback policies. At block 802, the method 800 may involve the playback device causing playback of a media item from the playlist associated with the controller application. For example, this may involve the playback device causing playback of the media item in accordance with one or more applied policies, e.g., any of the playback-event policies discussed above.

At block 804, the method 800 may involve, during playback of the media item, detecting a playback event. The playback event may be any of the playback events discussed above. The playback device may detect a playback event in a number of ways. For example, the playback device may detect selection data indicating that a play/pause or play/stop control has been selected. In other examples, the playback device may detect that a playback error occurred. For instance, the playback device may detect an HTTP error while attempting to obtain a media item. In yet other examples, the playback device may detect that the last media item of a playback queue has been played back. For example, the playback device may determine, based off of playback state information, that playback has reached the end of the playback queue. In particular, upon reaching the end of the playback queue, the playback device may transmit playback state information to, for example, a control device that may then return data indicating that the playback device has reached the end of the playback queue.

In some implementations, another device may detect a given playback event and communicate with the playback device to inform it that the event occurred. For example, the control device or a controller device may detect that a given playback event occurred and then transmit to the playback device information regarding the event, such as the type of playback event that was detected, the time it was detected, etc.

At block 806, the method 800 may involve the playback device managing the detected playback event in accordance with one or more playback-event policies that are associated with the controller application. Managing the detected playback event may include one or more operations, which may depend on the playback-event policy.

For instance, in accordance with a playback-error policy, managing a detected playback error may involve causing the media playback system 110 to enter into a playback-paused or playback-stopped (e.g., pausing/stopping playback and not playing a new media item) state instead of skipping to a next media item in the playback queue. In other examples, managing a detected playback error may involve the playback device obtaining or re-fetching at least a portion of a media item that was playing when the playback error was detected. For example, this operation may involve obtaining segments of the media item that have yet to be played at the time the playback error was detected. Other operations may also be performed when managing a detected playback error.

In other examples, in accordance with a playback-paused or playback-stopped state policy, managing a detected playback-paused or playback-stopped state may involve the playback device re-determining a media item locater of the media item that is playing when such a state is detected. In certain implementations, causing playback of the media item may involve the playback device determining a media item locater of the media item. In particular, for certain types of media (e.g., Internet radio), the playback device 112 may perform a sequence of dereferencing operations to media item locaters (e.g., URIs or URLs) of the media.

Without a playback-paused or playback-stopped state policy, the playback device 112 may attempt to use the same media item locater when playback is resumed after the media playback system 110 enters into a paused or stopped state. However, the media item locater may only be a "one-time" locater or may have expired while the media playback system was in the paused or stopped state. Accordingly, a playback-paused or playback-stopped state policy may instead cause the playback device 112 to perform the dereferencing operations again and thereby determine a usable media-item locater of the media item that was playing when the event was detected.

Similarly, in other implementations, a playback-paused or playback-stopped state policy may cause the playback device to determine that a media-item locater of the media item that was playing when the pause or stop state was detected is about to expire or has expired and then automatically re-determine, re-obtain or otherwise refresh the media-item locater of the media item. For example, a given media-item locater may expire after a predetermined amount of time. The playback device may detect or otherwise determine this expiration time and monitor the expiration time for the media-item locater of the currently playing media item. When the playback device detects a playback-paused or playback-stopped state, it may determine that the expiration time is within a threshold amount of time from expiring or has already expired. The playback device may then automatically obtain a usable media-item locater, for example, prior to the media playback system resuming playback of the media item.

In other examples involving a playback-paused or playback-stopped state policy, managing a detected playback-paused or playback-stopped state may involve the playback device storing in an audio cache a buffered portion of the media item that is playing when such a state is detected. For instance, in example implementations, causing playback of a media item may involve the playback device buffering at least a portion of the media item prior to audible playback. In accordance with a playback-paused or playback-stopped state policy, this buffered portion of the media item may be stored in an audio cache, which may facilitate a quick resumption of playback of that media item. Without such a policy, the buffered portion of the media item may be discarded and when playback is resumed, the playback device may open a new connection with a media service provider and buffer a portion of the media item before audible playback resumes.

In some implementations, a playback-paused or playback-stopped state policy that affects caching buffered portions of media may have additional sub-policies that may require one or more additional operations. For example, one such sub-policy may cause the playback device to first determine that the buffered portion of the media item is less than or equal to a predetermined size of the audio cache, and then based on such determination, store in the audio cache the buffered portion of the media items. That is, such a sub-policy may cause the playback device to determine that the buffered portion will fit in the audio cache and if not, the buffered portion may be discarded. In another example, even if the whole buffered portion would not fit in the audio cache, the playback device may nonetheless store the portion that does fit and discard the portion that does not fit. When play back resumes and the playback device may, when necessary, open a new connection to obtain the portion that was discarded.

In yet other examples, in accordance with a last-item event policy, managing a detected last-item event may involve stopping playback of the playback queue and emptying the playback queue. For example, without the policy, after the last media item of a playback queue is played, playback may continue by returning to the first media item of the playback queue. However, an example last-item event policy may cause the playback device to stop playback of the playback queue and clear the playback queue after detecting the last-item event. Other example operations in response to detecting a last-item event are also possible.

It should be understood that one or more policies may be applied to any of the one or more media items. Further, it should be understood that one or more applied policies may affect one or more devices of the media playback system simultaneously during playback of the one or more media items. On the other hand, some devices may be affected while others may not be. Moreover, it should be understood that multiple policies may be triggered by the same stimulus, and in example implementations, each of the respective operations triggered by the respective policies may be executed. And in other example implementations, the multiple policies may be prioritized based on a number of considerations, for example, any of the one or more characteristics of the one or more media items discussed above, such that a higher priority policy may be executed instead of a lower priority policy.

Additionally, it should be understood that multiple playback devices of a media playback system may simultaneously playback media in accordance with different policies (e.g., respective policies associated with respective controller applications). For example, a given media playback system may include a first playback device, a first controller device with a first media application, a second playback device, and a second controller device with a second media application (or perhaps the media playback system may include one controller device with both the first and second media applications). The first media application (operating as a first controller application) may cause the first controller device to forward to the first playback device media from a first playlist provided by a first media service, while the second media application (operating as a second controller application) may cause the second controller device to forward to the second playback device media from a second playlist provided by a second media service. Thereafter, the first playback device may playback media provided by the first media service in accordance with a first set of policies associated with the first controller application, while the second playback device may playback media provided by the second media service in accordance with a second set of policies associated with the second controller application. In some examples, the first and second sets of policies may include some overlapping policies, but in general, each set of policies may be particular to the associated controller application.

Although the methods 600 and 800 were discussed above as being carried out by a playback device, other suitable devices may also carry out these methods or methods similar to the methods 600 and 800. In some implementations, one or more of the operations involved in the methods may be modified depending on the device that performs the method. For example, a control device (e.g., a dedicated control device) of the media playback device 110 may carry out methods similar to the methods 600 and 800. As such, the control device may perform certain functions and then send signals to another device of the media playback system 110 (e.g., the playback device 112) thereby causing that device to perform an operation. For example, similar to blocks 604 and 606 of method 600, the control device may apply to one or more media items one or more policies and then send signals to the playback device 112 to cause playback of the one or more media items in accordance with the one or more applied policies.

2. Example Implementations of Compliance with Policies

Some implementations may involve compliance by a control device (e.g., the control device 400) of the media playback system 110 with one or more policies. In particular, an example implementation may involve a computing device of a media playback system (e.g., a control device) receiving a request to playback one or more media items that are from a playlist associated with a controller application. In some examples, this function may involve the control device receiving the request from another computing device (e.g., the controller device 114). In other examples, this function may involve the control device receiving request data indicating the request to playback the one or more media items. For example, a controller interface of the control device may receive one or more inputs that cause the control device to receive the request data. In yet other examples, this function may be performed in a similar manner as discussed above with reference to block 602 of FIG. 6.

Thereafter, an example implementation may involve the computing device causing a graphical display to display a playback interface in accordance with one or more policies that are associated with the controller application. In implementations, the control device may cause a user interface (e.g., the user interface 408) to display a controller interface (e.g., the controller interface 500) in accordance with one or more policies that are discussed above. Such policies may include display and/or playback policies. In one example, a display policy may cause the control device to display playback information regarding a currently playing media item but not playback information for media items that follow the currently playing media item in playback order. Other examples are possible, some of which are discussed above.

In some implementations, before the control device causes the graphical display to display the playback information in accordance with the one or more policies, the control device may first determine that the one or more policies apply to the one or more media items. Based on the particular applied policies, the control device may determine one or more display characteristics that affect one or more display aspects of the playback interface.

In examples, before the control device causes the graphical display to display the playback interface in accordance with the policies, the control device may send signals to the playback device 112 that cause the playback device 112 to playback the one or more media items. The control device may then cause the graphical display to display the playback interface in accordance with the policies in a similar manner as discussed above with reference to block 606 of FIG. 6.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, examples provided herein are directed to policies related to playback of media items. In one aspect, a method is provided. The method involves: (a) receiving, by a computing device of a media playback system, a request to playback one or more media items that are from a playlist associated with a controller application, (b) applying to the one or more media items one or more playback policies that are associated with the controller application, where a given playback policy restricts at least one aspect of playback of at least one of the one or more media items, and (c) causing playback of the one or more media items in accordance with the one or more playback policies.

In another aspect, a computing device is provided. The computing device includes at least a network interface configured to communicatively couple the computing device to a media playback system, a graphical display, a non-transitory computer-readable medium, and program instructions stored on the non-transitory computer-readable medium that are executable by at least one processor to cause the computing device to: (a) a request to playback one or more media items that are from a playlist associated with a controller application, (b) apply to the one or more media items one or more playback policies that are associated with the controller application, where a given playback policy restricts at least one aspect of playback of at least one of the one or more media items, and (c) causing playback of the one or more media items in accordance with the one or more playback policies.

In yet another aspect, a non-transitory computer-readable medium is provided. The non-transitory computer-readable medium having instructions stored thereon that are executable by a computing device of a media playback system to cause the computing device to perform functions, the functions including: (a) receiving a request to playback one or more media items that are from a playlist associated with a controller application, (b) applying to the one or more media items one or more playback policies that are associated with the controller application, where a given playback policy restricts at least one aspect of playback of at least one of the one or more media items, and (c) causing playback of the one or more media items in accordance with the one or more playback policies.

In one other aspect, a method is provided. The method involves: (a) receiving, by a computing device of a media playback system, a request to playback one or more media items that are from a playlist associated with a controller application, and (b) causing a graphical display to display a playback interface in accordance with one or more display policies that are associated with the controller application, where a given display policy restricts at least one aspect of display when one of the one or more media items is played back.

In another aspect, a computing device is provided. The computing device includes at least a network interface configured to communicatively couple the computing device to a media playback system, a graphical display, a non-transitory computer-readable medium, and program instructions stored on the non-transitory computer-readable medium that are executable by at least one processor to cause the computing device to: (a) receive a request to playback one or more media items that are from a playlist associated with a controller application, and (b) cause the graphical display to display a playback interface in accordance with one or more display policies that are associated with the controller application, where a given display policy restricts at least one aspect of display when one of the one or more media items is played back.

In yet another aspect, a non-transitory computer-readable medium is provided. The non-transitory computer-readable medium having instructions stored thereon that are executable by a computing device of a media playback system to cause the computing device to perform functions, the functions including: (a) receiving a request to playback one or more media items that are from a playlist associated with a controller application, and (b) causing a graphical display to display a playback interface in accordance with one or more display policies that are associated with the controller application, where a given display policy restricts at least one aspect of display when one of the one or more media items is played back.

In yet one other aspect, a method is provided. The method involves: (a) causing, by a computing device of a media playback system, playback of a media item from a playlist associated with a controller application, (b) during playback of the media item, detecting a playback event, and (c) managing the detected playback event in accordance with one or more playback-event policies that are associated with the controller application.

In another aspect, a computing device is provided. The computing device includes at least a network interface configured to communicatively couple the computing device to a media playback system, a graphical display, a non-transitory computer-readable medium, and program instructions stored on the non-transitory computer-readable medium that are executable by at least one processor to cause the computing device to: (a) cause playback of a media item from a playlist associated with a controller application, (b) during playback of the media item, detect a playback event, and (c) manage the detected playback event in accordance with one or more playback-event policies that are associated with the controller application.

In yet another aspect, a non-transitory computer-readable medium is provided. The non-transitory computer-readable medium having instructions stored thereon that are executable by a computing device of a media playback system to cause the computing device to perform functions, the functions including: (a) causing playback of a media item from a playlist associated with a controller application, (b) during playback of the media item, detecting a playback event, and (c) managing the detected playback event in accordance with one or more playback-event policies that are associated with the controller application.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method to be performed by a computing system comprising at least one first server, the method comprising:
    receiving, via a network interface of the at least one first server, data representing a request to play back first audio tracks on a first group including two or more first playback devices of a first media playback system, wherein the first media playback system is associated with a first subscriber to a streaming media service, and wherein the first media playback system is physically located in a first commercial establishment;
    determining, via the at least one first server, that the first subscriber is associated with one or more first subscriber policies of the streaming media service, wherein the one or more first subscriber policies comprise one or more first display properties;
    sending, via the network interface of the at least one first server to a group coordinator of the first group, instructions to play back the first audio tracks on the first group including the two or more first playback devices according to the one or more first subscriber policies of the streaming media service, wherein the first group is expandable to one or more additional first playback devices, wherein the group coordinator of the first group plays back the first audio tracks according to the one or more first subscriber policies and sends data to group members to synchronize playback within the first group according to the one or more first subscriber policies, and wherein the two or more first playback devices stream the first audio tracks from one or more second servers;
    sending, via the network interface of the at least one first server, one or more first display commands that instruct a first controller application on a first control device to modify a first controller interface in accordance with the one or more first display properties, wherein modifying the first controller interface in accordance with the one or more first display properties comprises disabling one or more first playback controls on the first controller interface based on the one or more first display properties and wherein the first control device is separate and distinct from the two or more first playback devices;
    receiving, via the network interface of the at least one first server, data representing a request to play back second audio tracks on a second group including one or more second playback devices of a second media playback system, wherein the second media playback system is associated with a second subscriber to the streaming media service, and wherein the second media playback system is physically located in a second commercial establishment;
    determining, via the at least one first server, that the second subscriber is associated with one or more second subscriber policies of the streaming media service, wherein the one or more first subscriber policies restrict one or more additional playback functions relative to at least one playback function restricted by the one or more second subscriber policies, wherein the one or more second subscriber policies comprise one or more second display properties;
    sending, via the network interface of the at least one first server to a group coordinator of the second group, instructions to play back the second audio tracks on the second group including the one or more second playback devices according to the one or more second subscriber policies of the streaming media service, wherein the second group is expandable to one or more additional second playback devices, wherein the group coordinator of the second group plays back the second audio tracks according to the one or more second subscriber policies, and wherein the one or more second playback devices stream the second audio tracks from the one or more second servers; and
    sending, via the network interface of the at least one first server, one or more second display commands that instruct a second controller application on a second control device to modify a second controller interface in accordance with the one or more second display properties, wherein modifying the second controller interface in accordance with the one or more second display properties comprises enabling one or more second playback controls on the second controller interface based on the one or more second display properties, and wherein the second control device is separate and distinct from the one or more second playback devices.

2. The method of claim 1, wherein the one or more first subscriber policies comprise one or more playback policies that: (i) prevent playback commands received via a control interface of the two or more first playback devices from modifying a playback order of the first audio tracks and (ii) prevent playback commands received via a network interface of the two or more first playback devices from modifying the playback order of the first audio tracks.

3. The method of claim 2, wherein a curated playlist of the streaming media service consists of the first audio tracks.

4. The method of claim 1, wherein the one or more first subscriber policies comprise one or more first playback policies that (a) allow playback of curated playlists of the streaming media service and (b) prevent on-demand streaming of audio tracks from the streaming media service, and wherein the one or more second subscriber policies comprise one or more second playback policies that (a) allow playback of curated playlists of the streaming media service and (b) allow on-demand streaming of audio tracks from the streaming media service.

5. The method of claim 1, wherein disabling the one or more first playback controls on the first controller interface based on the one or more first display properties comprises disabling one or more playback controls that cause the first control device to send respective playback commands to (i) skip playback of one of the first audio tracks, (ii) replay a previously played audio track of the first audio tracks, (iii) seek forward during playback of one of the first audio tracks, (iv) seek backward during playback of one of the first audio tracks, or (v) replay a currently playing audio track of the first audio tracks.

6. The method of claim 1, wherein the computing system comprises the one or more second servers, and wherein the method further comprises:
   streaming, via the one or more second servers, the first audio tracks to the two or more first playback devices; and
   streaming, via the one or more second servers, the second audio tracks to the one or more second playback devices.

7. The method of claim 1, further comprising:
   sending, via the network interface of the at least one first server, data representing instructions to add at least one additional second playback device to the second group, wherein after the second group is expanded to include the at least one additional second playback device, the group coordinator of the second group sends data to group members to synchronize playback within the first group according to the one or more second subscriber policies.

8. The method of claim 1, further comprising:
   sending, via the network interface of the at least one first server, one or more third display commands that instruct a third controller application on a third control device to modify a third controller interface in accordance with the one or more first display properties, wherein modifying the third controller interface in accordance with the one or more first display properties comprises disabling one or more first playback controls on the third controller interface based on the one or more first display properties.

9. A computing system comprising at least one first server, the at least one first server comprising:
   a network interface;
   one or more hardware processors;
   data storage storing instructions that, when executed by the one or more hardware processors, cause the at least one first server to perform functions comprising:
   receiving, via the network interface, data representing a request to play back first audio tracks on a first group including two or more first playback devices of a first media playback system, wherein the first media playback system is associated with a first subscriber to a streaming media service, and wherein the first media playback system is physically located in a first commercial establishment;
   determining that the first subscriber is associated with one or more first subscriber policies of the streaming media service, wherein the one or more first subscriber policies comprise one or more first display properties;
   sending, via the network interface to a group coordinator of the first group, instructions to play back the first audio tracks on the first group including the two or more first playback devices according to the one or more first subscriber policies of the streaming media service, wherein the first group is expandable to one or more additional first playback devices, wherein the group coordinator of the first group plays back the first audio tracks according to the one or more first subscriber policies and sends data to group members to synchronize playback within the first group according to the one or more first subscriber policies, and wherein the two or more first playback devices stream the first audio tracks from one or more second servers;
   sending, via the network interface, one or more first display commands that instruct a first controller application on a first control device to modify a first controller interface in accordance with the one or more first display properties, wherein modifying the first controller interface in accordance with the one or more first display properties comprises disabling one or more first playback controls on the first controller interface based on the one or more first display properties and wherein the first control device is separate and distinct from the two or more first playback devices;
   receiving, via the network interface, data representing a request to play back second audio tracks on a second group including one or more second playback devices of a second media playback system, wherein the second media playback system is associated with a second subscriber to the streaming media service, and wherein the second media playback system is physically located in a second commercial establishment;
   determining that the second subscriber is associated with one or more second subscriber policies of the streaming media service, wherein the one or more first subscriber policies restrict one or more additional playback functions relative to at least one playback function restricted by the one or more second subscriber policies, wherein the one or more second subscriber policies comprise one or more second display properties;
   sending, via the network interface to a group coordinator of the second group, instructions to play back the second audio tracks on the second group including the one or more second playback devices according to the one or more second subscriber policies of the streaming media service, wherein the second group is expandable to one or more additional second playback devices, wherein the group coordinator of the second group plays back the second audio tracks according to the one or more second subscriber policies, and wherein the one or more second playback devices stream the second audio tracks from the one or more second servers; and
   sending, via the network interface, one or more second display commands that instruct a second controller application on a second control device to modify a second controller interface in accordance with the one or more second display properties, wherein modifying the second controller interface in accordance with the one or more second display properties comprises enabling one or more second playback controls on the second controller interface based on the one or more second display properties, and wherein the second control device is separate and distinct from the one or more second playback devices.

10. The computing system of claim 9, wherein the one or more first subscriber policies comprise one or more playback policies that: (i) prevent playback commands received via a control interface of the one or more two playback devices from modifying a playback order of the first audio tracks and (ii) prevent playback commands received via a network interface of the two or more first playback devices from modifying the playback order of the first audio tracks.

11. The computing system of claim 9, wherein the one or more first subscriber policies comprise one or more first playback policies that (a) allow playback of curated playlists of the streaming media service and (b) prevent on-demand streaming of audio tracks from the streaming media service, and wherein the one or more second subscriber policies comprise one or more second playback policies that (a) allow playback of curated playlists of the streaming media service and (b) allow on-demand streaming of audio tracks from the streaming media service.

12. The computing system of claim 9, wherein disabling the one or more first playback controls on the first controller interface based on the one or more first display properties comprises disabling one or more playback controls that cause the first control device to send respective playback commands to (i) skip playback of one of the first audio tracks, (ii) replay a previously played audio track of the first audio tracks, (iii) seek forward during playback of one of the first audio tracks, (iv) seek backward during playback of one of the first audio tracks, or (v) replay a currently playing audio track of the first audio tracks.

13. The computing system of claim 9, wherein the computing system comprises the one or more second servers, and wherein the functions further comprise:
   streaming the first audio tracks to the two or more first playback devices; and
   streaming the second audio tracks to the one or more second playback devices.

14. The computing system of claim 9, wherein functions further comprise:
   sending, via the network interface, data representing instructions to add at least one additional second playback device to the second group, wherein after the second group is expanded to include the at least one additional second playback device, the group coordinator of the second group sends data to group members to synchronize playback within the first group according to the one or more second subscriber policies.

15. The computing system of claim 9, wherein functions further comprise:
   sending, via the network interface, one or more third display commands that instruct a third controller application on a third control device to modify a third controller interface in accordance with the one or more first display properties, wherein modifying the third controller interface in accordance with the one or more first display properties comprises disabling one or more first playback controls on the third controller interface based on the one or more first display properties.

16. A tangible, non-transitory computer-readable medium having instructions stored thereon that, when executed by one or more processors of a computing system comprising at least one first server, cause the at least one first server to perform functions comprising:
   receiving, via a network interface, data representing a request to play back first audio tracks on a first group including two or more first playback devices of a first media playback system, wherein the first media playback system is associated with a first subscriber to a streaming media service, and wherein the first media playback system is physically located in a first commercial establishment;
   determining that the first subscriber is associated with one or more first subscriber policies of the streaming media service, wherein the one or more first subscriber policies comprise one or more first display properties;
   sending, via the network interface to a group coordinator of the first group, instructions to play back the first audio tracks on the first group including the two or more first playback devices according to the one or more first subscriber policies of the streaming media service, wherein the first group is expandable to one or more additional first playback devices, wherein the group coordinator of the first group plays back the first audio tracks according to the one or more first subscriber policies and sends data to group members to synchronize playback within the first group according to the one or more first subscriber policies, and wherein the two or more first playback devices stream the first audio tracks from one or more second servers;
   sending, via the network interface, one or more first display commands that instruct a first controller application on a first control device to modify a first controller interface in accordance with the one or more first display properties, wherein modifying the first controller interface in accordance with the one or more first display properties comprises disabling one or more first playback controls on the first controller interface based on the one or more first display properties and wherein the first control device is separate and distinct from the two or more first playback devices;
   receiving, via the network interface, data representing a request to play back second audio tracks on a second group including one or more second playback devices of a second media playback system, wherein the second media playback system is associated with a second subscriber to the streaming media service, and wherein the second media playback system is physically located in a second commercial establishment;
   determining that the second subscriber is associated with one or more second subscriber policies of the streaming media service, wherein the one or more first subscriber policies restrict one or more additional playback functions relative to at least one playback function restricted by the one or more second subscriber policies, wherein the one or more second subscriber policies comprise one or more second display properties;
   sending, via the network interface to a group coordinator of the second group, instructions to play back the second audio tracks on the second group including the one or more second playback devices according to the one or more second subscriber policies of the streaming media service, wherein the second group is expandable to one or more additional second playback devices, wherein the group coordinator of the second group plays back the second audio tracks according to the one or more second subscriber policies, and wherein the one or more second playback devices stream the second audio tracks from the one or more second servers; and
   sending, via the network interface, one or more second display commands that instruct a second controller application on a second control device to modify a second controller interface in accordance with the one or more second display properties, wherein modifying the second controller interface in accordance with the one or more second display properties comprises enabling one or more second playback controls on the second controller interface based on the one or more second display properties, and wherein the second control device is separate and distinct from the one or more second playback devices.

17. The tangible, non-transitory computer-readable medium of claim 16, wherein the one or more first subscriber policies comprise one or more playback policies that: (i) prevent playback commands received via a control interface of the two or more first playback devices from modifying a playback order of the first audio tracks and (ii) prevent playback commands received via a network interface of the two or more first playback devices from modifying the playback order of the first audio tracks.

18. The tangible, non-transitory computer-readable medium of claim 16, wherein the one or more first subscriber policies comprise one or more first playback policies that (a) allow playback of curated playlists of the streaming media service and (b) prevent on-demand streaming of audio tracks from the streaming media service, and wherein the one or more second subscriber policies comprise one or more second playback policies that (a) allow playback of curated playlists of the streaming media service and (b) allow on-demand streaming of audio tracks from the streaming media service.

19. The tangible, non-transitory computer-readable medium of claim 16, wherein functions further comprise:
sending, via the network interface, data representing instructions to add at least one additional second playback device to the second group, wherein after the second group is expanded to include the at least one additional second playback device, the group coordinator of the second group sends data to group members to synchronize playback within the first group according to the one or more second subscriber policies.

20. The tangible, non-transitory computer-readable medium of claim 16, wherein functions further comprise:
sending, via the network interface, one or more third display commands that instruct a third controller application on a third control device to modify a third controller interface in accordance with the one or more first display properties, wherein modifying the third controller interface in accordance with the one or more first display properties comprises disabling one or more first playback controls on the third controller interface based on the one or more first display properties.

\* \* \* \* \*

UNITED STATES PATENT AND TRADEMARK OFFICE
CERTIFICATE OF CORRECTION

| | |
|---|---|
| PATENT NO. | : 11,528,522 B2 |
| APPLICATION NO. | : 16/665810 |
| DATED | : December 13, 2022 |
| INVENTOR(S) | : Coburn, IV et al. |

It is certified that error appears in the above-identified patent and that said Letters Patent is hereby corrected as shown below:

In the Claims

In Column 32, in Claim 10, Line 55, delete "one or more two" and insert -- one or more second --, therefor.

Signed and Sealed this
Twenty-fourth Day of January, 2023

Katherine Kelly Vidal
*Director of the United States Patent and Trademark Office*